United States Patent
He

(10) Patent No.: US 7,978,371 B2
(45) Date of Patent: Jul. 12, 2011

(54) VECTOR HALF-TONING WITH MINIMUM LUMINANCE VARIATION DOT FORMATION

(75) Inventor: Zhen He, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 12/025,838

(22) Filed: Feb. 5, 2008

(65) Prior Publication Data

US 2009/0195798 A1    Aug. 6, 2009

(51) Int. Cl.
G06K 15/00    (2006.01)
H04N 1/60    (2006.01)

(52) U.S. Cl. ........ 358/2.1; 358/3.1; 358/3.21; 358/3.22; 358/1.9

(58) Field of Classification Search .................. None
See application file for complete search history.

(56) References Cited

U.S. PATENT DOCUMENTS

| | | | |
|---|---|---|---|
| 5,010,814 A | 4/1991 | Shishikura | |
| 5,621,546 A | 4/1997 | Klassen et al. | |
| 5,687,300 A | 11/1997 | Cooper | |
| 5,748,785 A | 5/1998 | Mantell et al. | |
| 5,784,496 A | 7/1998 | Mantell | |
| 5,991,512 A | 11/1999 | Shaked et al. | |
| 6,014,233 A | 1/2000 | Fan et al. | |
| 6,157,469 A | 12/2000 | Mestha | |
| 6,250,733 B1 | 6/2001 | Yao et al. | |
| 6,501,564 B1 | 12/2002 | Schramm et al. | |
| 6,870,644 B2 | 3/2005 | Schramm et al. | |
| 7,423,778 B2 * | 9/2008 | Hersch et al. | 358/1.9 |
| 7,499,203 B2 | 3/2009 | Yao | |
| 2003/0072016 A1 * | 4/2003 | Dalrymple et al. | 358/1.9 |
| 2005/0162704 A1 * | 7/2005 | He et al. | 358/3.06 |
| 2006/0132825 A1 | 6/2006 | Czudak et al. | |
| 2006/0215189 A1 | 9/2006 | Yao | |
| 2006/0227394 A1 * | 10/2006 | He | 358/518 |
| 2006/0238800 A1 | 10/2006 | Czudak et al. | |
| 2007/0165252 A1 | 7/2007 | Sasaki | |
| 2008/0239338 A1 | 10/2008 | Bailey et al. | |
| 2009/0195836 A1 | 8/2009 | He | |
| 2010/0020339 A1 | 1/2010 | He | |
| 2010/0259802 A1 | 10/2010 | He | |

OTHER PUBLICATIONS

U.S. Appl. No. 12/258,494, filed Oct. 27, 2008, He et al.
U.S. Appl. No. 12/420,490, filed Apr. 8, 2009, He.
Shaked et al., "Ink Relocation for Color Halftones", © Hewlett-Packard Company, 1999, p. 1-11.
Non-Final Office Action mailed Nov. 15, 2010, U.S. Appl. No. 12/025,842.

\* cited by examiner

*Primary Examiner* — Twyler L Haskins
*Assistant Examiner* — Barbara D Reinier
(74) *Attorney, Agent, or Firm* — Philip E. Blair; Fleit Gibbons Gutman Bongini & Bianco P.L.

(57) ABSTRACT

What is disclosed is a system and method for improving vector halftoning in ink-jet printers capable of dot-on-dot printing. In one embodiment, n input $C_i/M_i/Y_i$ channel and a colorant $K_i$ are received. If any of the $C_i/M_i/Y_i$ is greater than $100-K_i$ then that channel is clipped to $100-K_i$. Next, a minimum total coverage area of a secondary color RGB dot required to achieve a remaining CMY coverage area is determined. If the minimum total coverage area is non-zero, then the following steps are performed. Each of a primary output $C_o/M_o/Y_o$ is determined. Each of the primary outputs is then scaled by a ratio of the remaining primary color area over the total remaining toner coverage. The results are sorted and secondary color $R_o B_o G_o$ outputs are determined from the sorted results.

15 Claims, 3 Drawing Sheets

VECTOR HALF-TONING WITH MINIMUM LUMINANCE VARIATION DOT FORMATION

TECHNICAL FIELD

The present invention is generally directed to method for color printer half-toning and, more particularly, to methods for improving the quality of vector half-toning in ink jet products capable of dot-on-dot printing.

BACKGROUND

Raster type printers, which have been implemented with various print engines commonly found in the arts, such as electro-photographic print engines and ink jet print engines, employ half-toning to transform continuous tone image data to print data that can be printed as an array of dots that can be of substantially similar size. For example, 24 bit/pixel continuous tone image data can be half-toned to a plurality of single color one-bit per pixel bitmaps.

Half-toning may employ a screen having a matrix of different threshold values. A screen can be a data set with different print density values equally represented (or with a controlled unequal distribution for gamma-compensated screens). For monochrome printing, the image data is then compared with the screen thresholds at each position. If the image data exceeds the threshold, a dot is printed. Otherwise, that particular location remains unprinted.

Improved appearance can be provided using, for example, a pseudo-random stochastic screen having a "blue noise" characteristic. Such screens tend to have threshold values which are distributed so that adjacent values tend to be very different. Thus, any value or limited range of values will tend to be located at positions that are nicely spaced apart on the matrix. In this example, apparently even but random spacing can be emphasized at very low and high density values in a blue noise screen.

For printing with multiple colors, half-toning presents a particular challenge. For dot-on-dot printing, in which printed locations are printed with one or more dots, a single half-toning screen can be used. For instance, a field of 10% blue would have 10% of locations printed with cyan and magenta ink, while 90% of locations remain unprinted. This has the disadvantage of reduced spatial frequency with respect to methods that distribute dots to different locations. This also tends to give the appearance of darker dots more widely spaced apart, producing a grainy image. The same can be said for clustered dot printing techniques in which different color dots may be printed adjacent to each other or otherwise clustered to create a multi-dot cluster that reads as an intermediate color. Accordingly, it is desirable to print the individual dots at closely spaced separate (non-overlapping) locations, relying on the viewer's eye to integrate the different color dots into the intended color.

By using different screens having the threshold values arranged differently, the dots will tend not to align with each other. However, with uncorrelated screens, the printed patterns of different colors will tend to be randomly located with respect to each other. This can generate some graininess of an image as some dots happen to clump near others or overlap. To reduce this with two colors, an inverted screen can be used for one of the colors. An inverted screen often has values equal to the maximum screen value (less the screen value at the corresponding location on the other screen). Thus, 10% blue is printed by printing cyan dots at all locations where the threshold values of the original screen are 25 or less. Magenta dots are printed at locations of values of 230 and above on the original screen (25 or less on an inverted screen). Inverted screens can be limited in usefulness for several reasons.

First, inverted screens may only be used for two colors. This can be inadequate for most multiple color printing systems. Where image quality is not critical in tri-color Cyan, Magenta, Yellow (CMY) systems, the darker C and M dots may be printed in this way while the less visible yellow dots may be distributed otherwise. For four-color systems employing black ink and for multi-level grayscale printing, the inverted screen may not provide desired image quality.

Second, for two color systems where one color is printed at the lowest value range positions, and another is printed at the highest value range positions, those positions are not relatively well dispersed with respect to each other in a blue noise screen. Although it will not generate overlapping droplets at less than full coverage printing, a high frequency blue noise screen may lead to clumps of adjacent dots. Beyond the random effects leading to such clumping, widely different values are more likely to be adjacent to each other.

For three and four color systems, a shifted screen approach has been employed to avoid pure dot-on-dot printing for some colors. This can lead to increased graininess of the image but often generates unwanted low frequency artifacts that are visible in the printed image. Moire patterns may also be generated.

It can be difficult to achieve substantial uniformity or even distribution of the half-toned dots in dot-on-dot printing devices. Substantial uniformity can be computationally expensive.

Another cause of half-tone pattern graininess is spatial luminance variation. A basic property of the color map which is advantageous to control is how the light level, or luminance, changes throughout the color map. Luminance is a photometric quantity which, in essence, is the effect of radiance on our eyes. Radiance is the physical quantity related to light intensity, i.e., the power of the light spreading out in some solid angle over an area. Luminance is a single scalar, (i.e., the integration of radiance weighted with a curve), which describes how efficiently different wavelengths of light trigger cone receptors in our eyes. Because luminance is a weighted integral of radiance, a linear relationship exists between the two. Brightness, on the other hand, is the subjective visual experience of luminance. Roughly, it is the effect of luminance on the brain. Because its a subjective quantity, the relationship of brightness to luminance is non-linear, approximately a cube root.

In many cases, it is desirable that luminance increase monotonically. In other cases, it is desirable that it to remain fixed. One reason why luminance variation is important is because luminance plays a fundamental role in perceptual psychology, i.e., how we perceive details and shapes in images. Perceptual psychology tells us that in most circumstances, luminance is the dominant axis in color perception. But luminance is also how we determine shape from shading. So, if we want to indicate values on a surface of an object by color mapping it, but we also want to show the shape of the object by shading it, then the color map probably shouldn't have any luminance variations in itself, as these could be perceptually misleading. Therefore, it is important to minimize luminance variation for a given C/M/Y/K input.

What is needed in this art is a method which maximizes the dot coverage and therefore leaves the least amount of white void, and which uses as many primary dots as possible before switching to secondary dots and finally the black dots. What is further needed is a method which achieves this while avoiding abrupt color and half-tone texture transitions for close CMYK inputs.

BRIEF SUMMARY

What is presented are a novel system, method, and computer program product for improving the quality of vector half-toning in ink jet products capable of dot-on-dot printing. Minimum spatial luminance variation is utilized to achieve a smooth color half-toning pattern transition. Red (M+Y), blue (C+M), and green (C+Y) dots, in addition to CMY dots, are utilized to achieve darker colors without black ink. As gray values to be printed get darker, green, red and blue pixels get introduced. Black is not introduced until the gray values are darker by approximately 30%. Given a fixed half-toning step, the CMY to CMYKRGB conversion is controlled. The primary CMY color densities are used as high as possible before any secondary color dots are used. With the maximum possible primary CMY color densities achieved, the secondary color densities are used as high as possible before using any black dots. This minimizes black dot density generation. Secondary color densities are minimized by maximizing primary color densities. The computational load is effectively reduced.

In one embodiment, the present method for improving the quality of vector halftoning in ink-jet printers capable of dot-on-dot printing involves performing the following. An input $C_i/M_i/Y_i$ channel and a colorant $K_i$ are received. If any of the $C_i/M_i/Y_i$ is greater than $100-K_i$ then that channel is clipped to $100-K_i$. Next, a minimum total coverage area of a secondary color RGB dot required to achieve a remaining CMY coverage area is determined. If the minimum total coverage area is non-zero, then the following steps are performed. Each of a primary output $C_o/M_o/Y_o$ is determined. For each of a color coverage $C_2/M_2/Y_2$, a remaining primary color area and a total remaining toner coverage are determined. Each of the primary outputs $C_o/M_o/Y_o$ are then scaled by a ratio of the remaining primary color area over the total remaining toner coverage. Remaining $C_3/M_3/Y_3$ are sorted to produce sorted results. An amount of a secondary color $R_o B_o G_o$ outputs is determined based on the sorted results.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed herein are a system and method for improving the quality of vector half-toning in ink jet products capable of dot-on-dot printing.

It should also be understood that one of ordinary skill in this art would be readily familiar with color imaging processes and dot-on-dot printing as well as with luminance variations and half-toning techniques found in the art. One of ordinary skill would also be readily familiar with color imaging, and imaging systems, software, and programming sufficient to implement the following functionality and capabilities as described in detail herein in their own imaging environments without undue experimentation.

Figure 1:
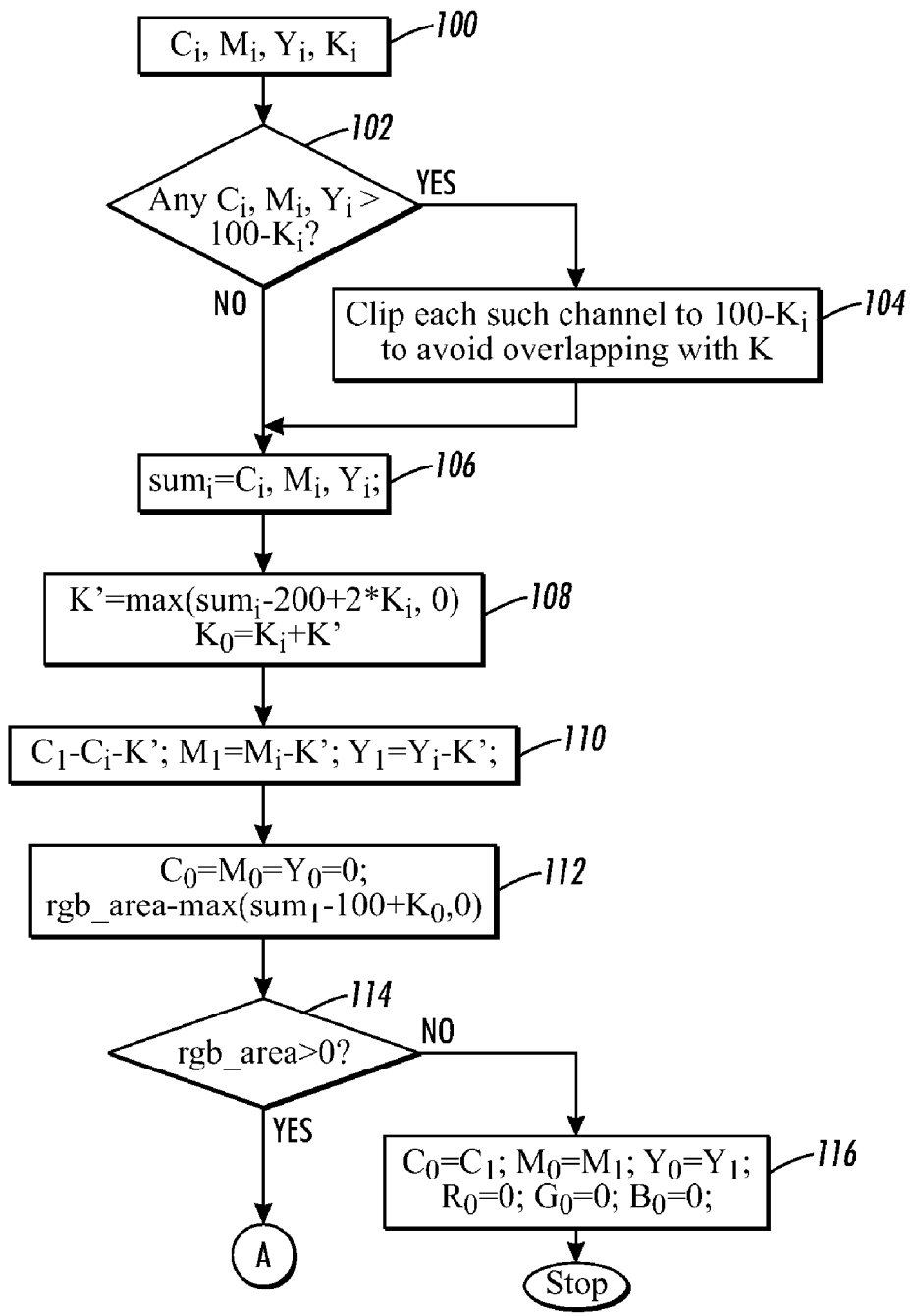
FIG. 1 illustrates a flowchart of one embodiment of the present method for improving the quality of vector half-toning in dot-on-dot printing systems.

Reference is now being made to FIG. 1 illustrating one embodiment of the input CMYK to output CMYKRGB conversion.

In order to simplify the discussion hereof, several assumptions are made. First, it is assumed that any C, M and Y overlapping C, M and Y is replaced by a K colorant. Second, no other colorant is allowed to overlap with colorant K. One skilled in this art would understand that these two assumptions are typical of solid ink printers. These assumptions should not be viewed as limiting. If necessary, these two constraints can be removed. It is also assumed that the ink coverage range of each colorant is scaled from 0 to 100.

In the embodiment shown, at step 100, the method receives $C_i/M_i/Y_i$ and $K_i$ channel inputs.

At step 102, a determination is made whether any of the input $C_i/M_i/Y_i$ channels are greater than $100-K_i$. If these channels are greater than $100-K_i$, then they are clipped, at 104, to meet the previous assumption that no other colorant be allowed to overlap with a dot of K colorant.

At step 106, the total remaining toner coverage is computed. The total toner coverage is determined as the values of $C_i$, $M_i$, and $Y_i$ added together. The total remaining toner coverage is thus given by: $sum_i = C_i + M_i + Y_i$.

At step 108, the minimum extra black coverage K' is determined. The minimum extra black coverage is the amount of the K to be replaced by K colorant required to achieve the desired input CMY coverage. The minimum extra black coverage is given by: $K' = \max(sum_i - 200 + 2 * K_i, 0)$. The value of $K_o$ is given by:

$$K_o = K_i + K'.$$

At step 110, each of the remaining $C_1/M_1/Y_1$ ink coverages is computed as the value of the color less the extra black coverage required. Thus the remaining ink coverages are given by: $C_1 = C_i - K'$, $M_1 = M_i - K'$, and $Y_1 = Y_i - K'$. The total remaining toner coverage is: $sum_1 = C_1 + M_1 + Y_1$.

At step 112, the values of $C_o$, $M_o$, and $Y_o$ are set to zero, and the minimum total coverage of the secondary color dots RGB required to achieve the desired CMY coverage is computed. The minimum total coverage of the secondary color RGB is the total RGB area, and is given by: $rgb\_area = \max(sum_1 - 100 + K_o, 0)$.

At step 114, a determination is made whether the computed total coverage of the secondary color RGB (rgb_area) equals zero.

At step 116, if rgb_area is zero then there is no RGB dot coverage needed. Thus, the primary color coverages can be given by: $C_o = C_1$; $M_o = M_1$; and $Y_o = Y_1$. Since there is no RGB dot coverage needed, $R_o = 0$; $G_o = 0$; and $B_o = 0$. The process is complete. Otherwise, the flow continues with respect to node A of FIG. 2.

Figure 2:
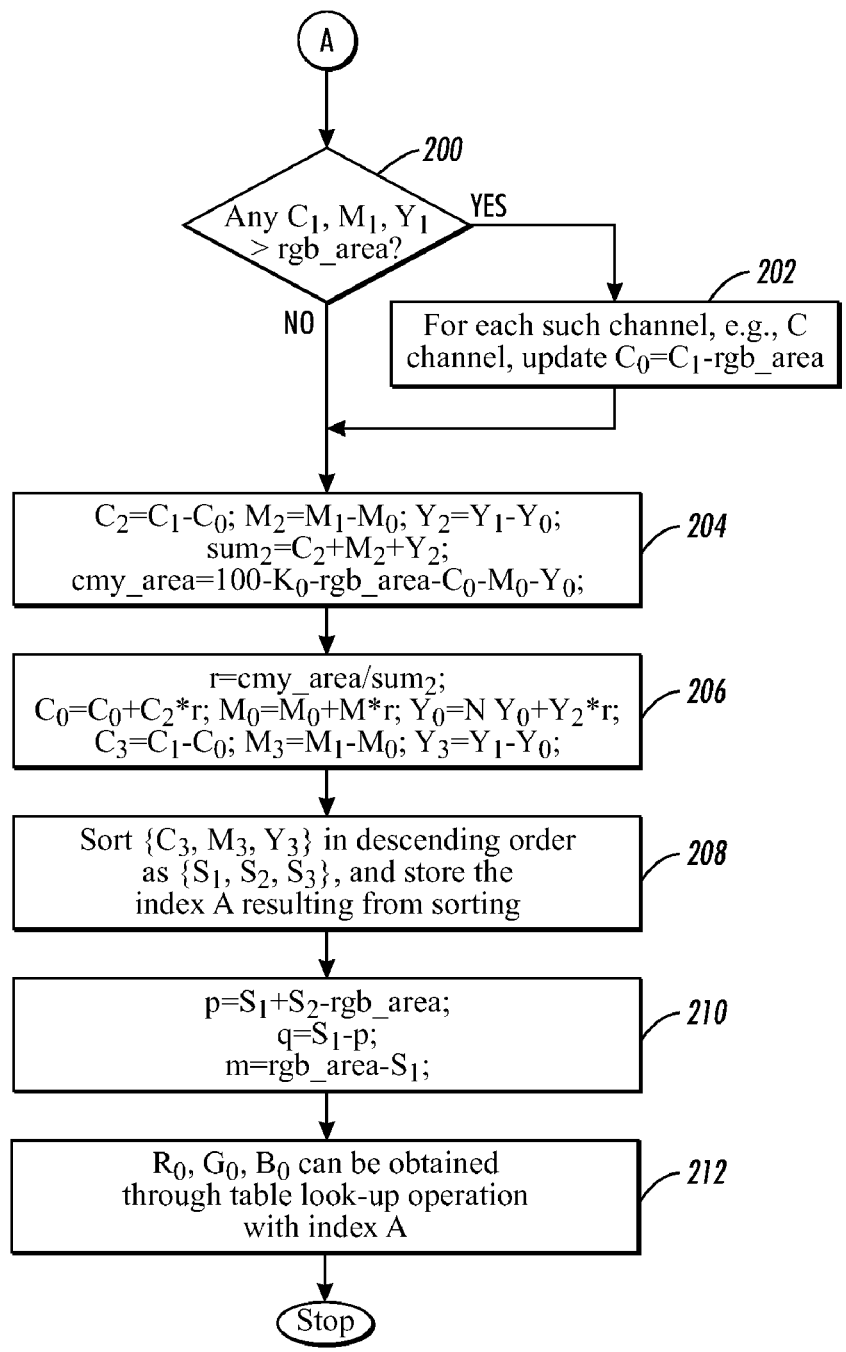
FIG. 2 is a continuation of the flow diagram of FIG. 1 with processing continuing with respect to node A.

Reference is now being made to FIG. 2 which is a continuation of the flow diagram of FIG. 1. Next, a determination needs to be made as to how much CMY color coverage belongs to primary color coverage.

At step 200, a determination is made whether any $C_i/M_i/Y_i$ coverage is greater than the total coverage of the secondary color RGB area (rgb_area). Any portion of $C_i/M_i/Y_i$ coverage that is greater than the rgb_area belongs to the primary color coverage because the same colorant cannot overlap itself.

At step 202, each primary color channel, which is greater than the computed total coverage area, must be part of primary dot formation and is calculated as: $C_o=C_1-\text{rgb\_area}$; $M_o=M_1-\text{rgb\_area}$; and $Y_o=Y_1-\text{rgb\_area}$.

At step 204, the color coverage, given by $C_2/M_2/Y_2$, is scaled to fit a remaining primary color area (cmy_area) in order to enforce the continuity constraint to minimize the potential abrupt color and half-tone texture transition artifact for close CMYK input. The remaining $C_3/M_3/Y_3$ coverage which is dedicated to formation of the secondary color coverage can be adjusted such that: $C_3=C_1-C_o$, $M_3=M_1-M_o$, and $Y_3=Y_1-Y_o$, to achieve a desired input CMY coverage. The total toner coverage is given by: $\text{sum}_2=C_2+M_2+Y_2$. And, the remaining primary color area becomes: $\text{cmy\_area}=100-K_o-\text{rgb\_area}-C_o-M_o-Y_o$.

At step 206, the resulting primary color coverage output $C_o/M_o/Y_o$ and the remaining color coverage $C_3/M_3/Y_3$ are computed from the secondary color RGB dots to achieve the desired input CMY coverage. Thus, the primary color coverage is given by: $C_o=C_o+C_2*r$; $M_o=M_o+M_2*r$; and $Y_o=Y_o+Y_2*r$ and the remaining color coverage is given by: $C_3=C_1-C_o$, $M_3=M_1-M_o$, and $Y_3=Y_1-Y_o$, where $r=\text{cmy\_area}/\text{sum}_2$.

At step 208, a descending sort of the remaining $C_3/M_3/Y_3$ coverage is performed. The resulting sorted order is given as $\{S_1, S_2, S_3\}$. A sort order index (A) is obtained.

At step 210, the quantities of three secondary color coverages, p, q and m are given by: $p=S_1+S_2-\text{rgb\_area}$; $q=S_1-p$; and $m=\text{rgb\_area}-S_1$;

At step 212, the assignment to secondary color output $R_oG_oB_o$ can be determined through a lookup table (LUT) using the obtained sort order index A. Table 1 shows a secondary color output lookup-table indexed by sort order.

TABLE 1

| | Sort Index | | | | | |
|---|---|---|---|---|---|---|
| Output | [1 2 3] | [1 3 2] | [2 1 3] | [2 3 1] | [3 1 2] | [3 2 1] |
| $R_o$ | m | m | q | p | q | p |
| $G_o$ | q | p | m | m | p | q |
| $B_o$ | p | q | p | q | m | m |

One half-toning algorithm to be applied afterwards is disclosed in U.S. Pat. No. 6,250,773 entitled: Color Printer Half-toning Method, to Yao et al, (June 2001), which is incorporated herein by reference in its entirety.

Table 2 provides sample results.

TABLE 2

| | Output | | | | | | |
|---|---|---|---|---|---|---|---|
| CMYK Input | C | M | Y | K | R | G | B |
| (40, 50, 0, 0) | 40 | 50 | 0 | 0 | 0 | 0 | 0 |
| (30, 50, 70, 0) | 6.9231 | 11.5385 | 31.5385 | 0 | 26.9231 | 11.5385 | 11.5385 |
| (50, 70, 90, 0) | 0 | 0 | 0 | 10 | 50 | 30 | 10 |
| (50, 20, 40, 40) | 4.5455 | 1.8182 | 3.6364 | 40.0000 | 4.5455 | 31.8182 | 13.6364 |
| (20, 60, 80, 50) | 0 | 0 | 0 | 70 | 30 | 0 | 0 |
| (100, 100, 100, 0) | 0 | 0 | 0 | 100 | 0 | 0 | 0 |

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 3:
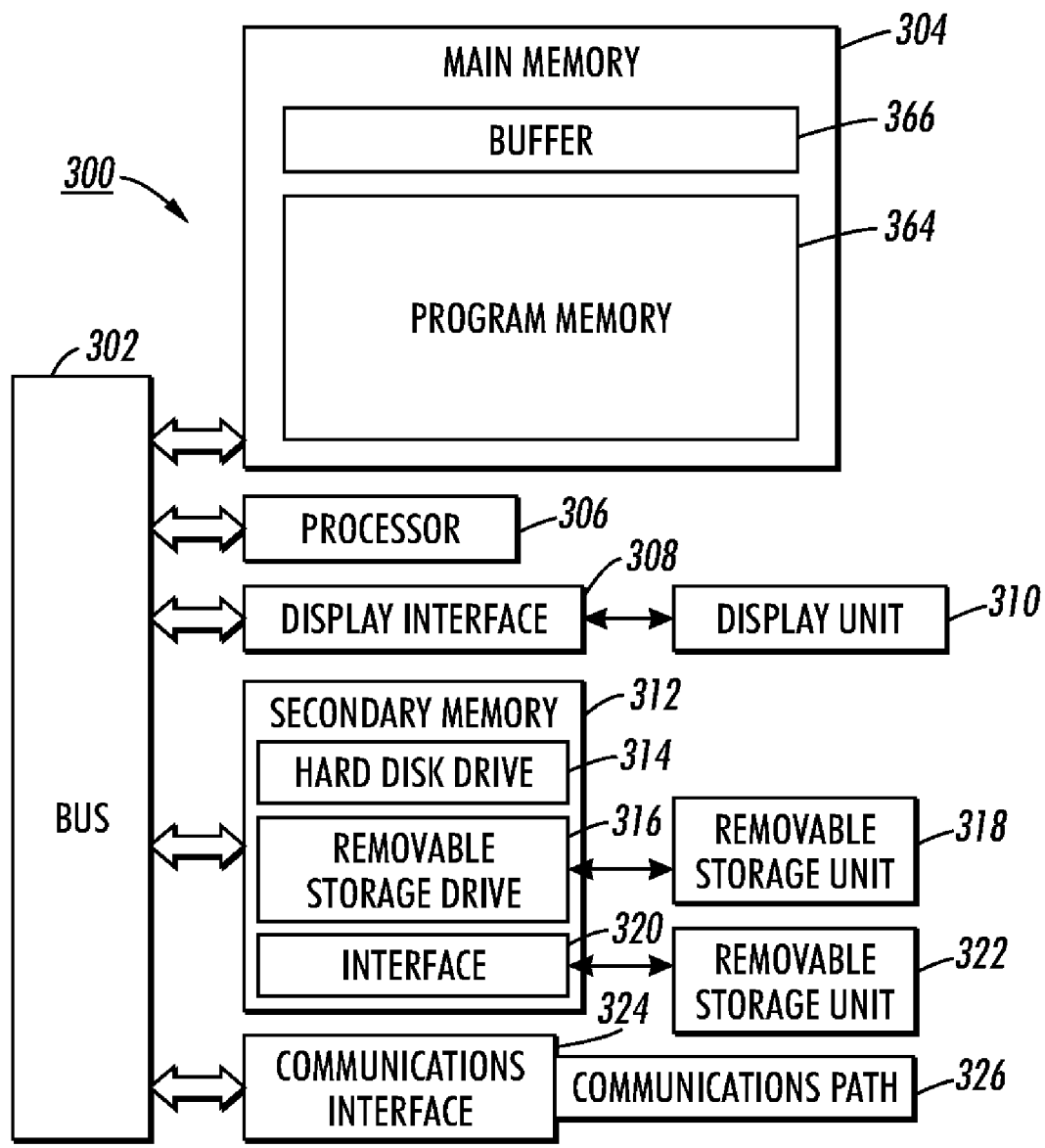
FIG. 3 is a block diagram of a computer system useful for implementing one embodiment of the method illustrated in the flow diagram of FIG. 4.

Reference is now being made the system of FIG. 3 illustrating one embodiment of a block diagram of a computer system useful for implementing the method illustrated in the flow diagrams of FIGS. 1 and 2.

The computer system 300 can be, for example, a xerographic system, a photocopier, or printing device. The computer system includes one or more processors, such as processor 306 capable of executing machine executable program instructions. In the embodiment shown, the processor is in communication with bus 302 (e.g., a backplane interface bus, cross-over bar, or data network). The computer system also includes a main memory 304 that is used to store machine readable instructions. The main memory also being capable of storing data. Main memory may alternatively include random access memory (RAM) to support reprogramming and flexible data storage. Buffer 366 is used to temporarily store data for access by the processor. Program memory 364 includes, for example, executable programs that implement the embodiments of the methods described herein. The program memory storing at least a subset of the data contained in the buffer.

Computer system 300 includes a display interface 308 that forwards data from communication bus 302 (or from a frame buffer not shown) to display 310.

Computer system 300 also includes a secondary memory 312 includes, for example, a hard disk drive 314 and/or a removable storage drive 316 which reads and writes to removable storage 318, such as a floppy disk, magnetic tape, optical disk, etc., that stores computer software and/or data. The secondary memory alternatively includes other similar mechanisms for allowing computer programs or other instructions to be loaded into the computer system. Such mechanisms include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces which allow software and data to be transferred.

The computer system 300 includes a communications interface 324 which acts as both an input and an output to allow software and data to be transferred between the computer system and external devices. Examples of a communications interface include a modem, a network interface (such as an Ethernet card), a communications port, a PCMCIA slot and card, etc.

Computer programs (also called computer control logic) may be stored in main memory 304 and/or secondary memory 312. Computer programs may also be received via communications interface 324. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface. These signals are provided to a communications interface via a communications path (i.e., channel) which carries signals and may be implemented using wire, cable, fiber optic, phone line, cellular link, RF, or other communications channels.

Other Variations

Terms such as, computer program medium, computer executable medium, computer usable medium, and computer readable medium, are used herein to generally refer to media such as main memory and secondary memory, removable storage drive, a hard disk installed in a disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for vector halftoning in dot-on-dot printing devices, the method comprising:
    a non-transitory computer readable medium for storing instructions that, when executed on a computer, cause the computer to perform the method comprising:
    receiving an input $C_i/M_i/Y_i$ channels and a colorant $K_i$;
    in response to any of said input $C_i/M_i/Y_i$ channels being greater than a predetermined threshold, clipping each of said input $C_i/M_i/Y_i$ to $100-K_i$;
    determining a minimum extra black coverage K' based upon said input $C_i/M_i/Y_i$ channels and $K_i$, where $K'=\max(sum_i-200+2*K_i,0)$, and where $sum_i=C_i+M_i+Y_i$;
    determining a minimum total coverage area of a secondary color RGB dot (rgb area) required to achieve a remaining CMY coverage; and
    in response to said minimum total coverage area being non-zero:
        removing said determined amount of minimum extra black coverage K' to obtain an amount of remaining ink coverage given by: $C_1=C_i-K'$, $M_1=M_i-K'$, and $Y_1=Y_i-K'$, respectively;
        determining each of a primary output $C_o/M_o/Y_o$;
        for each of a $C_2/M_2/Y_2$, determining a remaining primary color area (cmy_area) and a total remaining toner coverage ($sum_2$);
        scaling each of said determined primary outputs $C_o/M_o/Y_o$ by a ratio of said remaining primary color area over said total remaining toner coverage;
        adjusting a remaining $C_3/M_3/Y_3$ dedicated to formation of a secondary color to achieve a desired input CMY coverage;
        sorting said remaining $C_3/M_3/Y_3$ to produce sorted results; and
        determining secondary $R_o G_o B_o$ based on said sorted results.

2. The method of claim 1, wherein said primary output $C_o/M_o/Y_o$ comprises: $C_1$–rgb_area; $M_1$–rgb_area; and $Y_1$–rgb_area, respectively.

3. The method of claim 2, wherein said remaining primary color area comprises: cmy_area=100−$K_o$−rgb_area−$C_0$−$M_o$−$Y_o$, said $C_2/M_2/Y_2$ comprises: $C_1$−$C_o$, $M_1$−$M_o$, and $Y_1$−$Y_o$, respectively, and said total remaining toner coverage comprises: $sum_2$=$C_2$+$M_2$+$Y_2$.

4. The method of claim 3, wherein said ratio comprises: r=cmy_area/$sum_2$, wherein said total remaining toner coverage comprises: $sum_2$=$C_2$+$M_2$+$Y_2$, and wherein said scaled primary outputs comprise: $C_o$+$C_2$*r, $M_o$+$M_2$*r, and $Y_o$+$Y_2$*r, respectively.

5. The method of claim 4, wherein adjusting said remaining $C_3/M_3/Y_3$ comprises: $C_1$−$C_o$, $M_1$−$M_o$, and $Y_1$−$Y_o$, respectively.

6. A system for vector halftoning in dot-on-dot printing devices, the system comprising:
a storage medium capable of storing data; and
a processor in communication with said storage medium, said processor capable of executing a machine readable instruction for performing the method of:
receiving an input $C_i/M_i/Y_i$ channels and a colorant $K_i$;
in response to any of said input $C_i/M_i/Y_i$ channels being greater than a predetermined threshold, clipping each of said input $C_i/M_i/Y_i$ to 100−$K_i$;
determining a minimum extra black coverage K' based upon said input $C_i/M_i/Y_i$ channels and $K_i$, where K'=max($sum_i$−200+2*$K_i$, 0), and where $sum_i$=$C_i$+$M_i$+$Y_i$;
determining a minimum total coverage area of a secondary color RGB dot (rgb area) required to achieve a remaining CMY coverage; and
in response to said minimum total coverage area being non-zero:
removing said determined amount of minimum extra black coverage K' to obtain an amount of remaining ink coverage given by: $C_1$=$C_i$−K', $M_1$=$M_i$−K', and $Y_1$=$Y_i$−K', respectively;
determining each of a primary output $C_o/M_o/Y_o$;
for each of a $C_2/M_2/Y_2$, determining a remaining primary color area (cmy_area) and a total remaining toner coverage ($sum_2$);
scaling each of said determined primary outputs $C_o/M_o/Y_o$ by a ratio of said remaining primary color area over said total remaining toner coverage;
adjusting a remaining $C_3/M_3/Y_3$ dedicated to formation of a secondary color to achieve a desired input CMY coverage;
sorting said remaining $C_3/M_3/Y_3$ to produce sorted results; and
determining secondary $R_o G_o B_o$ based on sorted results.

7. The system of claim 6, wherein said primary output $C_o/M_o/Y_o$ comprises: $C_1$−rgb_area; $M_1$−rgb_area; and $Y_1$−rgb_area, respectively.

8. The system of claim 7, wherein said remaining primary color area comprises: cmy_area=100−$K_o$−rgb_area−$C_o$−$M_o$−$Y_o$, said $C_2/M_2/Y_2$ comprises: $C_1$−$C_o$, $M_1$−$M_o$, and $Y_1$−$Y_o$, respectively, and said total remaining toner coverage comprises: $sum_2$=$C_2$+$M_2$+$Y_2$.

9. The system of claim 8, wherein said ratio comprises: r=cmy_area/$sum_2$, wherein said total remaining toner coverage comprises: $sum_2$=$C_2$+$M_2$+$Y_2$, and wherein said scaled primary outputs comprise: $C_o$+$C_2$*r, $M_o$+$M_2$*r, and $Y_o$+$Y_2$*r, respectively.

10. A computer program product for vector halftoning in dot-on-dot printing devices, the computer program product comprising:
a non-transitory computer readable medium for storing instructions that, when executed on a computer, cause the computer to perform a method comprising:
receiving an input $C_i/M_i/Y_i$ channels and a colorant $K_i$;
in response to any of said input $C_i/M_i/Y_i$ channels being greater than a predetermined threshold, clipping each of said input $C_i/M_i/Y_i$ to 100−$K_i$;
determining a minimum extra black coverage K' based upon said input $C_i/M_i/Y_i$ channels and $K_i$, where K'=max($sum_i$−200+2*$K_i$, 0), and where $sum_i$=$C_i$+$M_i$+$Y_i$;
determining a minimum total coverage area of a secondary color RGB dot (rgb area) required to achieve a remaining CMY coverage; and
in response to said minimum total coverage area being non-zero:
removing said determined amount of minimum extra black coverage K' to obtain an amount of remaining ink coverage given by: $C_1$=$C_i$−K', $M_1$=$M_i$−K', and $Y_1$=$Y_i$−K', respectively;
determining each of a primary output $C_o/M_o/Y_o$;
for each of a $C_2/M_2/Y_2$, determining a remaining primary color area (cmy_area) and a total remaining toner coverage ($sum_2$);
scaling each of said determined primary outputs $C_o/M_o/Y_o$ by a ratio of said remaining primary color area over said total remaining toner coverage;
adjusting a remaining $C_3/M_3/Y_3$ dedicated to formation of a secondary color to achieve a desired input CMY coverage;
sorting said remaining $C_3/M_3/Y_3$ to produce sorted results; and
determining secondary $R_o G_o B_o$ based on said sorted results.

11. The computer program product of claim 10, wherein said primary output $C_o/M_o/Y_o$ comprises: $C_1$−rgb_area; $M_1$−rgb_area; and $Y_1$−rgb_area, respectively.

12. The computer program product of claim 11, wherein said remaining primary color area comprises: cmy_area=100−$K_o$−rgb_area−$C_o$−$M_o$−$Y_o$, said $C_2/M_2/Y_2$ comprises: $C_1$−$C_o$, $M_1$−$M_o$, and $Y_1$−$Y_o$, respectively, and said total remaining toner coverage comprises: $sum_2$=$C_2$+$M_2$+$Y_2$.

13. The computer program product of claim 12, wherein said ratio comprises: r=cmy_area/$sum_2$, wherein said total remaining toner coverage comprises: $sum_2$=$C_2$+$M_2$+$Y_2$, and wherein said scaled primary outputs comprise: $C_o$+$C_2$*r, $M_o$+$M_2$*r, and $Y_o$+$Y_2$*r, respectively.

14. The computer program product of claim 13, wherein adjusting said remaining $C_3/M_3/Y_3$ comprises: $C_1$−$C_o$, $M_1$−$M_o$, and $Y_1$−$Y_o$, respectively.

15. The system of claim 9, wherein adjusting said remaining $C_3/M_3/Y_3$ comprises: $C_1$−$C_o$, $M_1$−$M_o$, and $Y_1$−$Y_o$, respectively.

* * * * *